(12) United States Patent
Chiou et al.

(10) Patent No.: US 6,674,595 B1
(45) Date of Patent: Jan. 6, 2004

(54) CONTROLLED IMPEDANCE AMPLIFIERS

(75) Inventors: Chii-Fa Chiou, Lake Forest, CA (US); Yuji Isobe, Irvine, CA (US)

(73) Assignee: Texas Instruments Incorporated, Dallas, TX (US)

( * ) Notice: Subject to any disclaimer, the term of this patent is extended or adjusted under 35 U.S.C. 154(b) by 88 days.

(21) Appl. No.: 09/714,052

(22) Filed: Nov. 15, 2000

(51) Int. Cl.[7] ............................. G11B 5/02; G11B 5/09
(52) U.S. Cl. .......................................... 360/67; 360/46
(58) Field of Search .............................. 360/66, 46, 67

(56) References Cited

U.S. PATENT DOCUMENTS

| | | | | |
|---|---|---|---|---|
| 5,168,397 A | * | 12/1992 | Iwamura et al. | 360/67 |
| 5,717,361 A | * | 2/1998 | Saito | 360/67 |
| 5,793,551 A | * | 8/1998 | Ngo et al. | 360/67 |
| 6,111,711 A | * | 8/2000 | Barber et al. | 360/46 |
| 6,341,046 B1 | * | 1/2002 | Peterson | 360/67 |

* cited by examiner

*Primary Examiner*—Regina N. Holder
(74) *Attorney, Agent, or Firm*—Bret J. Petersen; W. James Brady, III; Frederick J. Telecky, Jr.

(57) ABSTRACT

A hard disk drive (HDD) circuit (10) having feedback provided to an input of an differential amplifier setting the amplifier input impedance close to a flexible printed circuit (FPC) characteristic impedance. A matched source and input impedance produces a generally flat gain frequency response. As the result of flat response and wider gain bandwidth, white noise without high frequency peaking can be obtained. Feedback resistors (R5) provide feedback according to the present invention which is superior in terms of the input referred noise since the feedback attenuates both the input signal from the sensor and the noise from the amplifier. Feedback resistors (R5) may be connected through AC coupling capacitors to compensate the voltage differences between amplifier input and output. The circuit of the present invention provides a method to connect the feedback resistors directly from amplifier outputs to inputs which have a different potential. The advantages of the present invention include matched impedance results and a better system level frequency response, the direct feedback connection eliminates costly on-chip capacitors, and the input impedance can be adjusted by the amount of feedback.

10 Claims, 2 Drawing Sheets

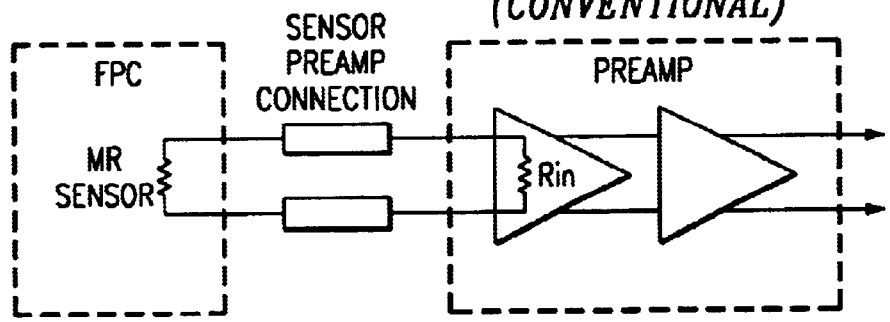
*FIG. 1*
*(CONVENTIONAL)*
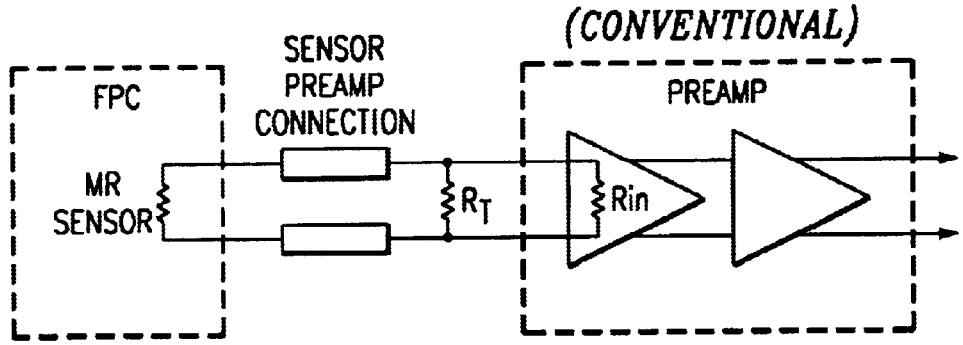
*FIG. 2*
*(CONVENTIONAL)*

CONTROLLED IMPEDANCE AMPLIFIERS

FIELD OF THE INVENTION

The present invention is generally related to mass storage devices including hard disk drive (HDD) systems, and more particularly to impedance mismatches between sensing heads on a flexible printed circuit (FPC) and a differential amplifier on a separate circuit board.

BACKGROUND OF THE INVENTION

In a HDD system, sensing heads adapted to read data from a magnetic storage media are typically mounted on a flexible printed circuited (FPC), and are usually electrically connected to a differential amplifier on a fixed printed circuit board as shown in FIG. 1. The sensor preamp connection is the connection between the MR sensor and the preamp, which has an input impedance of Rin. The FPC usually has a characteristic impedance of 50–150 ohms. Due to the impedance mismatch of the FPC impedance and the input impedance of the differential amplifier, the frequency response is not very flat, and in many cases peaking is present at a high frequency. The peaking in gain response is not favorable since it degrades group delay flatness, and generates high frequency noise. The peaking may also trigger an oscillation and makes the signal read back process unstable.

SUMMARY OF THE INVENTION

The present invention achieves technical advantages by adding feedback to the input of the differential amplifier to set the amplifier input impedance close to the FPC characteristic impedance. A matched source and input impedance produces a generally flat gain frequency response. As the result of flat response and wider gain bandwidth, white noise without high frequency peaking is obtained.

Conventionally, the input impedance may be set to a desired value by adding a termination resistor ($R_T$) in parallel with the input as shown in FIG. 2. However, the termination resistor attenuates the input signal but not the differential amplifier's noise. Thus, input noise referred to the sensing device increases. Providing feedback according to the present invention is superior in terms of the input referred noise since the feedback attenuates both the input signal from the sensor and the noise from the amplifier. The input referred noise to the sensor does not degrade. In general, the sensing devices are set close to ground potential, while the differential amplifier's outputs are usually close to positive supply voltage due to a nature of a differential amplifier. The feedback resistors may be connected through AC coupling capacitors to compensate the voltage differences between input and output. However, the AC coupling capacitors causes settling issues and increases physical die size. The circuit of the present invention provides a method to connect the feedback resistors directly from outputs to inputs which have different potential.

The advantages of the present invention include matched impedance results in better system level frequency response, the direct feedback connection eliminates costly on-chip capacitors, and the input impedance can be adjusted by the amount of feedback.

BRIEF DESCRIPTION OF THE DRAWINGS

FIG. 1 shows a typical HDD read back system;

FIG. 2 is an example of a conventional matched impedance system with a termination resistor;

DETAILED DESCRIPTION OF THE PREFERRED EMBODIMENT

Figure 3:
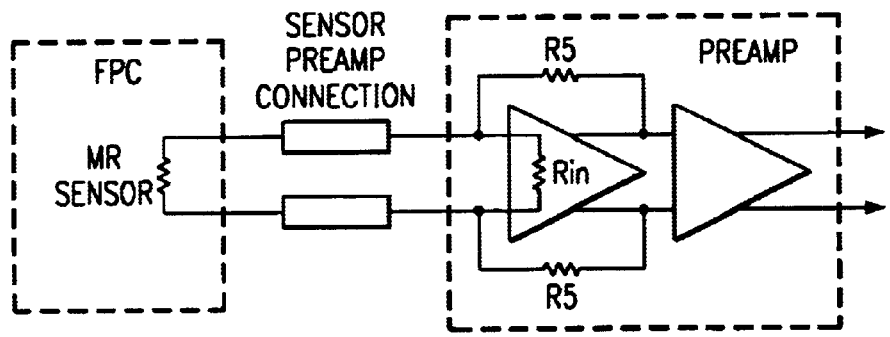
FIG. 3 shows a schematic diagram of the present invention including feedback to the input of the differential amplifier.
Figure 4:
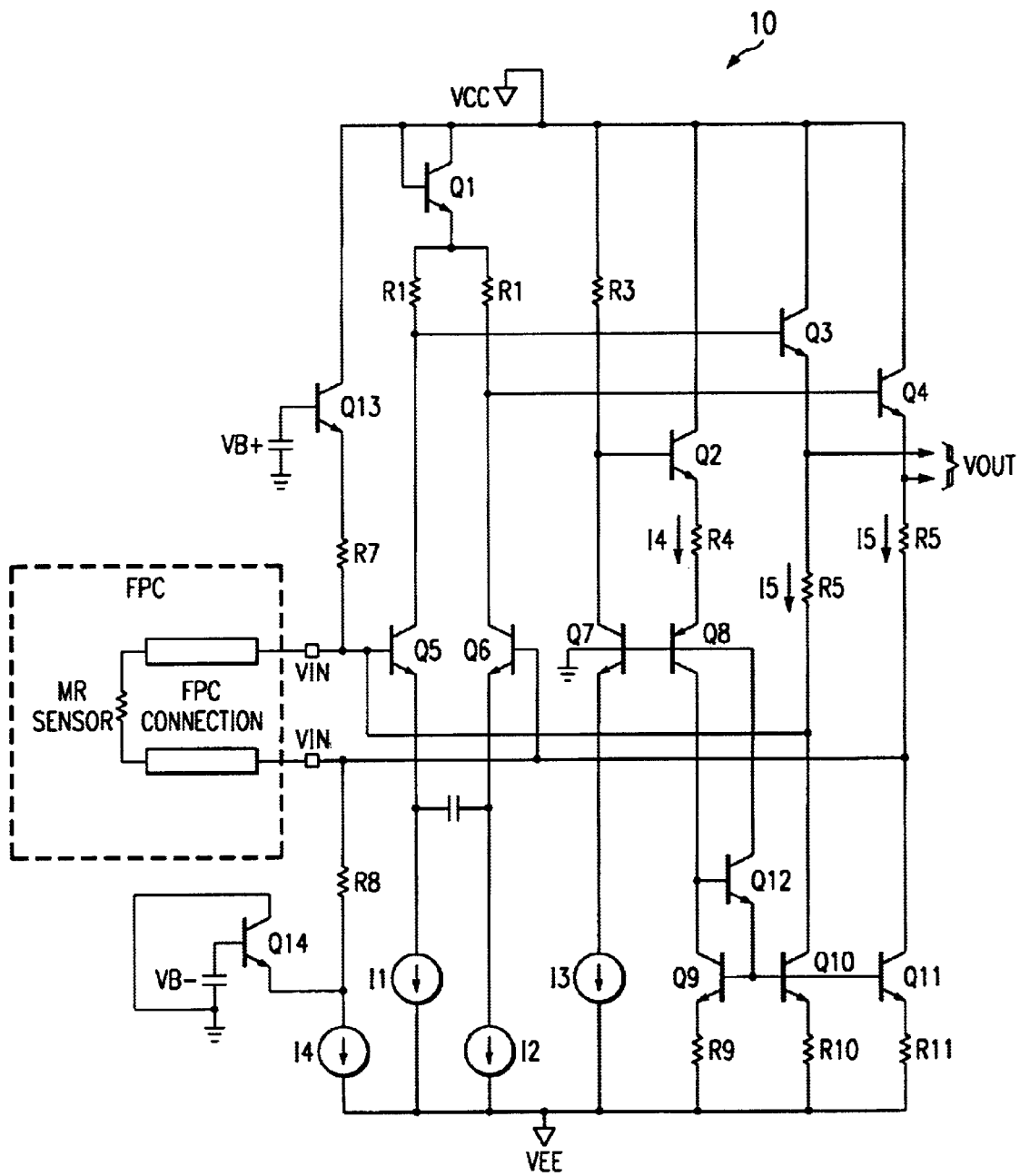
FIG. 4 is a schematic drawing of the present invention shown in FIG. 3.

Referring now to FIG. 4 in view of FIG. 3, the present invention achieves technical advantages by providing feedback from the output to the input through resistors R5 via a direct connection. The feedback resistors R5 have two functions, providing both AC signal feedback and preventing DC level shifting. The amount of feedback is set by the combination of the first stage gain and the resistor value of each R5. The input voltage, Vin, is set by a bias control circuits VB+ and VB– (comprising Q13 and R7, and Q14 and R8 respectively), and the feedback connection of R5 does not disturb the input voltage. In general, Vin is set to ground level, thus, the voltage drop across each R5 is set to the lower end of R5 to be at ground level. This can be embodied by the following method.

The output voltage of the amplifier $V_{OUT}$:

$$V_{OUT}=V_{CC}-I_1*R_1-2V_{BE}$$

By making a replica of the I1*R1 voltage drop into I3*R3 (i.e. I1*R1=I3*R3), obtain a current that conducts through resistor R4 (I4):

$$I4 = (V_{CC} - 2*V_{BE} - I_3*R_3)/R_4$$
$$= (V_{CC} - 2*V_{BE} - I_1*R_1)/R_4$$

The voltage at the lower end of the feedback resistor R5, $V_{IN}$, is given by:

$$V_{IN}=V_{OUT}-I_5*R_5$$

The voltage drop I5*R5 can be set to equal to the I4*R4 voltage drop with a simple current mirror, seen to include transistors Q7, Q8, Q2, Q9, Q10, Q11, and Q12 to establish current I4, and resistor ratio of R4 and R5, thus:

$$V_{IN}=V_{OUT}-I_4*R_4$$

Substituting equation (2) into equation (3):

$$V_{IN}=V_{CC}-I_1*R_1-2*V_{BE}-(V_{CC}-2*V_{BE}-I_1*R_1)=0$$

In conclusion, the lower end voltage of the feedback resistor R5 can be set at a ground potential with a simple resistor ratio and the current mirror circuit. As shown in the equation, the feedback circuit has no voltage supply dependency nor temperature dependency in terms of DC voltage.

Though the invention has been described with respect to a specific preferred embodiment, many variations and modifications will become apparent to those:skilled in the art upon reading the present application. It is therefore the intention that the appended claims be interpreted as broadly as possible in view of the prior art to include all such variations and modifications.

We claim:

1. A controlled impedance differential amplifier circuit in a
    pre-amp for amplifying a signal from a hard disk drive sensing head, comprising:
    an input from the sensing head having a characteristic line impedance, a differential amplifier having a pair of input terminals forming a differential input connected to the input from the sensing head, a pair of output terminals forming a differential output, and said differential amplifier providing a first stage gain; and a pair of feedback circuits each providing feedback, one said feedback circuit being coupled between each said differential output terminal and one said respective input terminal, wherein the input impedance at the input terminals is substantially matched to the line impedance.

2. The amplifier as specified in claim 1 wherein said differential amplifier further comprises a bias control circuit, which prevents said feedback from disturbing DC input voltage provided across said differential input.

3. The amplifier as specified in claim 2 wherein a voltage at said input terminals is set to a ground level.

4. The amplifier as specified in claim 2 wherein said feedback circuits comprise feedback resistors to provide AC signal feedback.

5. The amplifier as specified in claim 4 further comprising a current source for controlling a current through said feedback resistors to hold the voltage at the junction of the feedback resistor and the input to ground.

6. In combination:

a) a hard disk drive (HDD) sensor formed on a first circuit board having a characteristic line impedance; and b) a controlled impedance differential amplifier for amplifying a signal from the sensor comprising:

a differential amplifier having an input impedance at a pair of input terminals forming a differential input for the signal from the sensor, a pair of output terminals forming a differential output; and a pair of feedback circuits each providing feedback, one said feedback circuit being coupled between each said differential output terminal and one said respective input terminal, wherein the input impedance at the input terminals is substantially matched to the characteristic line impedance from the sensor.

7. The amplifier as specified in claim 6 wherein said differential amplifier further comprises a bias control circuit, which prevents said feedback from disturbing a DC input voltage provided across said differential input.

8. The amplifier as specified in claim 6 wherein a voltage at said input terminals is set to a ground level.

9. The amplifier as specified in claim 6 wherein said feedback circuits comprise feedback resistors to provide AC signal feedback.

10. The amplifier as specified in claim 6 further comprising a current source for controlling a current through said feedback resistors to hold the voltage at the junction of the feedback resistor and the input to ground.

* * * * *